United States Patent
Jiang et al.

(10) Patent No.: US 9,769,251 B2
(45) Date of Patent: *Sep. 19, 2017

(54) DEPLOYMENT OF VIRTUAL MACHINES

(71) Applicant: International Business Machines Corporation, Armonk, NY (US)

(72) Inventors: Tao Jiang, Shanghai (CN); Xian Dong Meng, Shanghai (CN); George J. Romano, Rochester, MN (US); Jianhua Rui, Shanghai (CN); Hong Bo Xu, Shanghai (CN); Xin Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/924,872

(22) Filed: Oct. 28, 2015

(65) Prior Publication Data

US 2017/0083356 A1    Mar. 23, 2017

Related U.S. Application Data

(63) Continuation of application No. 14/860,775, filed on Sep. 22, 2015.

(51) Int. Cl.
*G06F 9/455* (2006.01)
*H04L 29/08* (2006.01)

(52) U.S. Cl.
CPC .......... *H04L 67/10* (2013.01); *G06F 9/45558* (2013.01); *G06F 2009/4557* (2013.01); *G06F 2009/45575* (2013.01)

(58) Field of Classification Search
None
See application file for complete search history.

(56) References Cited

U.S. PATENT DOCUMENTS

| 7,577,722 B1 * | 8/2009 | Khandekar | G06F 9/45558 709/220 |
| 8,161,128 B2 * | 4/2012 | Yudenfriend | G06F 9/526 709/214 |
| 8,458,700 B1 * | 6/2013 | Arrance | G06F 9/45558 718/1 |

(Continued)

OTHER PUBLICATIONS

IBM, "List of IBM Patents or Patent Applications Treated as Related (Appendix P)," Oct. 28, 2015, p. 1-2.

(Continued)

*Primary Examiner* — Mehran Kamran
(74) *Attorney, Agent, or Firm* — Reza Sarbakhsh

(57) ABSTRACT

According to embodiments of the present invention, a method, a device and a computer program product for quick deployment of multiple virtual machines are provided. The method comprises mounting a centralized storage volume on a host in response to boot-up of a virtual machine on the host. The method further comprises obtaining unique information assigned to the virtual machine. In addition, the method comprises retrieving public and private configuration for the virtual machine from the centralized storage volume based on the obtained unique information, the public and private configuration being applied in the boot-up of the virtual machine on the host.

7 Claims, 6 Drawing Sheets

(56) References Cited

U.S. PATENT DOCUMENTS

| | | | | |
|---|---|---|---|---|
| 8,528,107 | B1* | 9/2013 | Ginzton | G06F 21/6281 713/193 |
| 8,621,462 | B2* | 12/2013 | Amanuddin | G06F 9/44505 718/1 |
| 8,789,041 | B2* | 7/2014 | Verma | G06F 8/63 709/226 |
| 8,924,524 | B2* | 12/2014 | Dalal | H04L 41/0843 709/203 |
| 2002/0049869 | A1* | 4/2002 | Ohmura | G06F 9/50 710/5 |
| 2002/0103882 | A1* | 8/2002 | Johnston | G09B 7/00 709/218 |
| 2005/0183082 | A1* | 8/2005 | Lewites | G06F 13/105 718/1 |
| 2006/0184935 | A1* | 8/2006 | Abels | G06F 9/5077 718/1 |
| 2006/0184937 | A1* | 8/2006 | Abels | G06F 8/65 718/1 |
| 2010/0325278 | A1* | 12/2010 | Heim | G06F 9/4416 709/226 |
| 2011/0047541 | A1* | 2/2011 | Yamaguchi | G06F 9/45558 718/1 |
| 2011/0246767 | A1* | 10/2011 | Chaturvedi | G06F 21/53 713/164 |
| 2011/0296230 | A1* | 12/2011 | Chen | H04L 49/357 714/3 |
| 2011/0302415 | A1* | 12/2011 | Ahmad | G06F 21/57 713/168 |
| 2012/0096271 | A1* | 4/2012 | Ramarathinam | H04L 63/0807 713/172 |
| 2012/0151477 | A1* | 6/2012 | Sinha | G06F 9/45558 718/1 |
| 2012/0191929 | A1* | 7/2012 | Zietzke | G06F 9/45533 711/162 |
| 2012/0246645 | A1* | 9/2012 | Iikura | G06F 8/61 718/1 |
| 2013/0080619 | A1* | 3/2013 | Assuncao | G06F 9/45558 709/224 |
| 2013/0111196 | A1* | 5/2013 | Pasam | G06F 21/575 713/1 |
| 2013/0212345 | A1* | 8/2013 | Nakajima | G06F 3/0605 711/161 |
| 2013/0232463 | A1* | 9/2013 | Nagaraja | G06F 8/61 717/101 |
| 2013/0297921 | A1* | 11/2013 | Wright | G06F 9/4406 713/2 |
| 2013/0311763 | A1* | 11/2013 | Saborowski | G06F 9/445 713/2 |
| 2014/0032920 | A1* | 1/2014 | Gehrmann | G06F 21/57 713/176 |
| 2014/0201533 | A1* | 7/2014 | Kruglick | H04L 63/062 713/171 |
| 2014/0237464 | A1* | 8/2014 | Waterman | G06F 8/65 717/172 |
| 2015/0089496 | A1* | 3/2015 | Thankappan | G06F 9/5005 718/1 |
| 2015/0178113 | A1* | 6/2015 | Dake | G06F 9/45558 718/1 |
| 2016/0048436 | A1* | 2/2016 | Yamazaki | G06F 11/2289 713/2 |
| 2016/0140343 | A1* | 5/2016 | Novak | G06F 21/575 713/2 |
| 2016/0224383 | A1* | 8/2016 | Bonzini | G06F 9/5016 |
| 2016/0342439 | A1* | 11/2016 | Woerndle | H04L 61/2596 |

OTHER PUBLICATIONS

Jiang et al., "Deployment of Virtual Machines," Application and Drawings, filed Sep. 22, 2015, 25 Pages, U.S. Appl. No. 14/860,775.

Kline et al., "Multiple z/OS Virtual Machines on z/VM," IBM Red Paper, Apr. 10, 2009, p. 1-26, Document International Business Machines Corporation. REDP-4507-00, International Business Machines Corporation.

Microsoft, "Rapid Provisioning of Virtual Machines Using SAN Copy Overview," Microsoft System Center Library, p. 1-4, https://technet.microsoft.com/en-us/library/gg610594(d=printer).aspx, Accessed on Sep. 11, 2015.

Sasquatch, "HOWTO: Use Shared Folders," VirtualBox Forums, Mar. 27, 2009, p. 1-2, phpBB Group, https://forums.virtualbox.org/viewtopic.php?f=29&t=15868&view=print, Accessed on Sep. 11, 2015.

* cited by examiner

DEPLOYMENT OF VIRTUAL MACHINES

BACKGROUND

In cloud environments, it is usually needed to deploy a great number of virtual machines (VMs) in a relatively short time. Each of those VMs should be configured with its own configuration, such as Internet Protocol (IP) address, Domain Name Server (DNS) address, and other post-deployment configuration, as part of provisioning. In addition, those VMs should also be configured with some shared configuration, such as patches for an operating system. Therefore, deploying such a great number of virtual machines may be a time consuming task.

Conventionally, VMs are deployed one by one, which often requires extensive manual intervention. In this way, it is infeasible to achieve quick deployment of massive VMs without manual intervention. In addition, specific configuration for each of those VMs is usually located separately, while shared configuration for all of those VMs is usually stored centrally. Therefore, extra access overhead may be needed to retrieve both the specific and shared configurations for a VM, since they cannot be retrieved at one time due to their different locations. Moreover, the deployment of VMs is often controlled by a centralized manager over an IP-based network. However, the dependency on the centralized manager over the IP-based network will become a performance bottleneck, for example, due to heavy traffic over the IP-based network caused by simultaneous deployment of massive VMs.

SUMMARY

In general, example embodiments of the present invention include a method, device and computer program product for quick deployment of virtual machines.

In an aspect, embodiments of the present invention provide a computer-implemented method. The method comprises mounting a centralized storage volume on a host in response to a boot-up of a virtual machine on the host. The method further comprises obtaining unique information assigned to the virtual machine. In addition, the method comprises retrieving public and private configuration for the virtual machine from the centralized storage volume based on the obtained unique information, the public and private configuration being applied in the boot-up of the virtual machine on the host.

In another aspect, embodiments of the present invention provide a device. The device comprises a storage volume mounting module configured to mount a centralized storage volume on a host in response to a boot-up of a virtual machine on the host. The device further comprises an information obtaining module configured to obtain unique information assigned to the virtual machine. In addition, the device comprises a configuration retrieving module that is configured to retrieve public and private configuration for the virtual machine from the centralized storage volume based on the obtained unique information, the public and private configuration being applied in the boot-up of the virtual machine on the host.

In yet another aspect, embodiments of the present invention provide a computer program product that is tangibly stored on a non-transient machine-readable medium. The instructions, when executed on a device, cause the device to mount a centralized storage volume on a host in response to a boot-up of a virtual machine on the host. The instructions, when executed on the device, further cause the device to obtain unique information assigned to the virtual machine. In addition, the instructions, when executed on the device, cause the device to retrieve public and private configuration for the virtual machine from the centralized storage volume based on the obtained unique information, the public and private configuration being applied in the boot-up of the virtual machine on the host.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
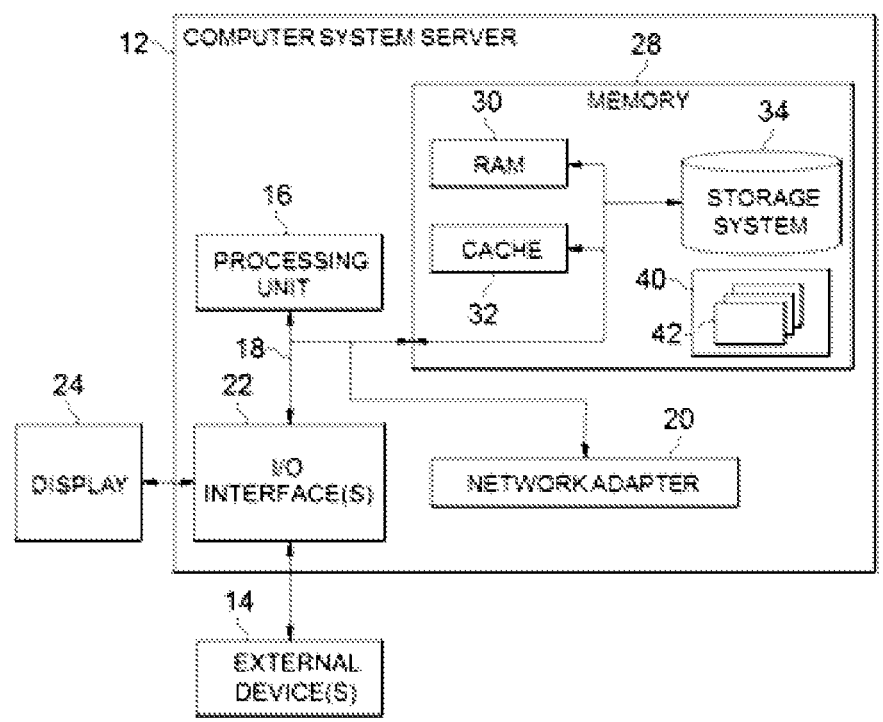
FIG. 1 is a block diagram of an electronic device in which embodiments of the present invention can be implemented.

Reference is first made to FIG. 1, in which an exemplary electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
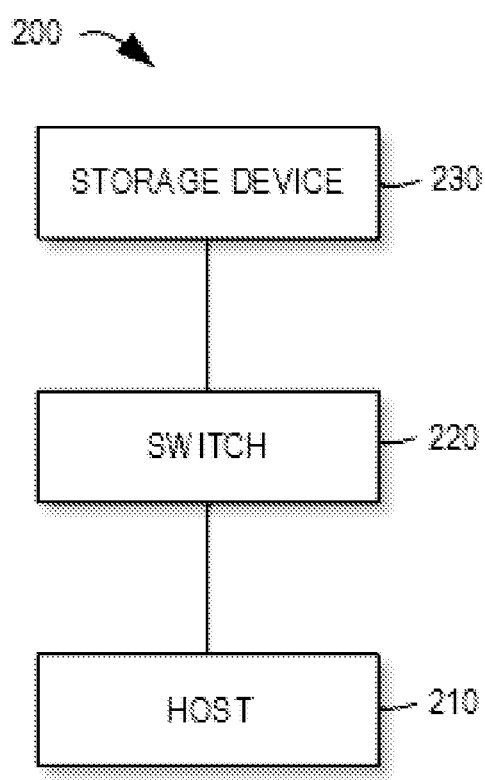
FIG. 2 is an environment 200 in which the embodiments of the present invention can be implemented.

FIG. 2 shows an environment 200 in which embodiments of the present invention can be implemented. In some embodiments, the environment 200 may be a cloud environment, such as a storage area network (SAN) system. In such embodiments, as shown, the environment 200 may include a host 210 and a storage device 230 which are both connected to a switch 220. The host 210 is the target on which one or more VMs are to be deployed. The storage device 230 may be used for storing related information of the VMs. The host 210 may access the information stored in the storage device 230 via the switch 220 to complete the VM deployment. One or more devices in the environment 200 may be implemented by computer system/server 12 as discussed with reference to FIG. 1, for example. In FIG. 2, the environment 200 is shown to include only one host 210, one switch 220, and one storage device 230. This is merely for the purpose of illustration, without suggesting any limitation to the number of devices in the environment.

As described above, it is often required to deploy a great number of VMs on the host 210. Each VM needs to be configured with its own configuration such as IP address, DNS address and other post-deployment configuration. It is desired to deploy and configure massive VMs quickly without any human interaction. Embodiments of the present invention enable such quick deployment of multiple VMs.

Figure 3:
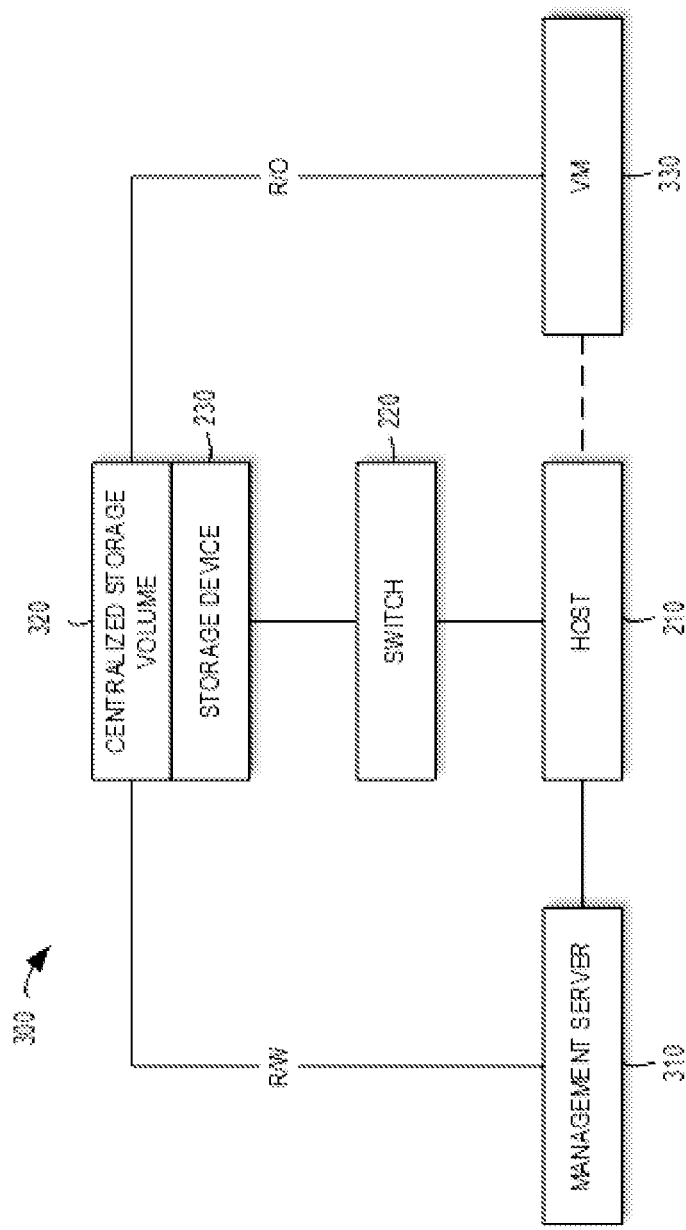
FIG. 3 is another environment 300 in which the embodiments of the present invention can be implemented.

FIG. 3 shows another environment 300 in which embodiments of the present invention can be implemented. In the environment 300, the storage device 230 may be a typical multi-disk drive, which may be partitioned into several separate storage volumes 320. Each storage volume is a logical unit assigned with a logical unit number (LUN). A storage volume 320 in the storage device 230 can be accessed by multiple entities and therefore may be referred to be a centralized storage volume. The centralized storage volume 320 may include a centralized database that stores data and files for the VM(s) 330 to be developed. In some embodiments, the centralized database may be implemented as a semi-structured database such as an Extensive Markup Language (XML) database.

The environment 300 further includes a management server 310 which is responsible for maintenance of the database in the centralized storage volume 320. The management server 310 may be a separate device connected to the host 210, as shown in FIG. 3. Alternatively, in other embodiments, the management server 310 may be implemented as a part of the host 210, for example, as a module executed thereon.

VMs 330 to be deployed onto the host 210 may be created in a variety of ways, either currently known or to be developed in the future. In creation, the VM 330 may be assigned with shared hardware resources, such as Central Processing Unit (CPU), memory, Ethernet card and Hose Bus Adapter (HBA) card, along with unique information generated for the VM 330, such as its name, its identifier, a Medium Access Control (MAC) address, and a World Wide Port Name (WWPN). The unique information assigned to the VM 330, such as the WWPN, may be difficult to be tampered with. In addition, in some embodiments, the VM 330 may include a deployment script into its boot-up procedure or routine. The deployment script may be used for deploying the VM 330, for example, by defining some specific actions to be performed during the deployment period of the VM 330. As known, the boot-up procedure will be automatically invoked in response to the boot-up of the VM 330.

In response to the creation of the VM 330, configuration for the VM 330 may be stored as a record in the centralized database in the centralized storage volume 320, for example, by the management server 310. In some embodiments, the record storing the configuration for the VM 330 in the centralized database may be read-only to ensure the security. The configuration of the VM 330 stored in the centralized database in the storage volume 320 may include private configuration and public configuration. Examples of the private configuration include, but are not limited to, IP address, network mask, gateway address, DNS address, post-install scripts, applications to be installed, and so on. Examples of the public configuration include, but are not limited to, patches for an operating system and files shared between virtual machines and so on.

In some embodiments, the private configuration for the VM 330 may be encrypted and then stored in the centralized database in order to ensure the security. The encryption can be done, for example, by using a symmetric encryption mechanism, such as Rivest Cipher 5 (RC5). The unique information assigned to the VM 330 (e.g., the combination of its WWPN and MAC address) may be used as a key. In addition, the record storing the configuration of the VM 330 may be indexed, for example, by a hash index. The hash index may be generated from the unique information assigned to the VM 330 such as the WWPN and MAC address thereof. Since the unique information assigned to the VM 330 (e.g., it's WWPN) is difficult to be tampered with, other VMs can hardly retrieve and/or decrypt the encrypted private configuration for the VM 330. Therefore, the private configuration is only accessible to the VM 330 itself, which may prevent data exposure in case of multi-tenant cloud deployment, for example. It should be understood that any suitable algorithms can be used to generate the hash index, either currently known or to be developed in the future. By using the hash index instead of directly using the name of the VM 330, it is possible to create multiple records for a single VM 330 in the centralized database. This would be beneficial, for example, in the case of replacing HBA card and/or Ethernet card or migration of the VM.

Figure 4:
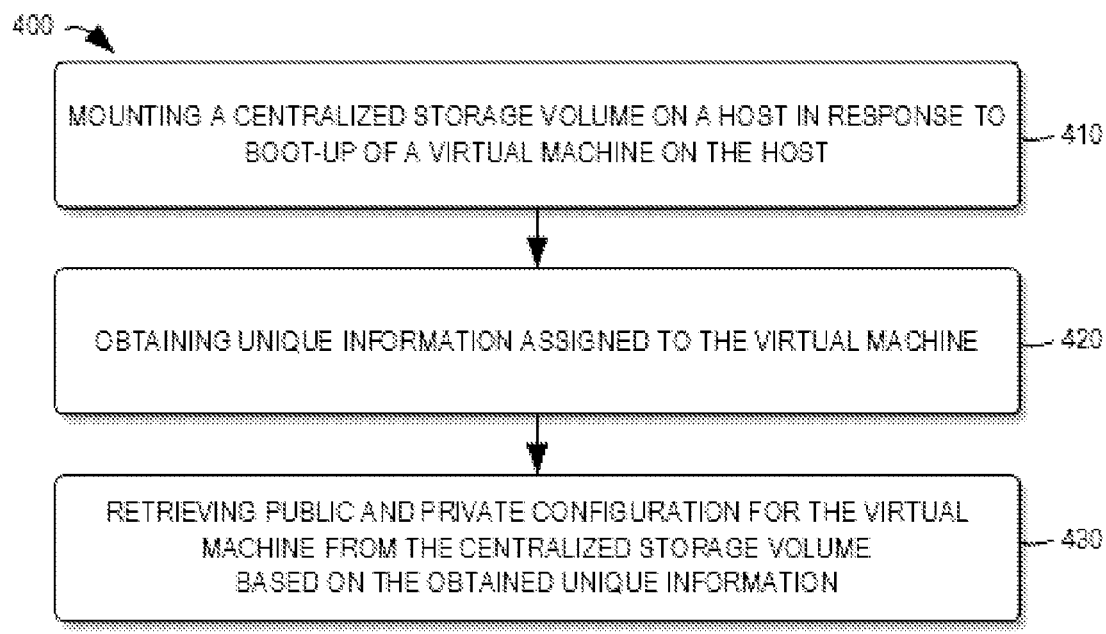
FIG. 4 is a flowchart of a method 400 for quick deployment of multiple virtual machines in accordance with embodiments of the present invention.

One or more VMs 330 may be deployed onto the host 210 in any suitable way. For example, in some embodiments, the storage level memory copy approach can be adopted to copy one or more VMs 330 to the host 210. In this way, multiple VMs 330 can be moved to the host 210 in one shot. In accordance with embodiments of the present invention, in deployment stage, each VM 330 may be customized according to its configuration stored in the centralized storage volume 320 during its first boot-up. An example embodiment in this regard will be discussed with reference to FIG. 4 which shows a flowchart of a method 400 for quick deployment of multiple VMs in accordance with embodiments of the present invention. In the method 400, the VM 330 is customized according to its configuration stored in the centralized storage volume 320 during its first boot-up. The method 400 will be described in connection with the example shown in FIG. 3.

The method 400 is entered in step 410, where the centralized storage volume 320 is mounted on the host 210 in response to boot-up of the VM 330 on the host 210. As described above, a deployment script may be included into the boot-up procedure of the VM 330, which will be automatically invoked in response to the boot-up. Upon being invoked, the deployment script may mount the centralized storage volume 320 on the host 210. As used herein, the terms "mount" or "mounting" refers to an action performed before a computer can use any kind of storage medium (such as a hard drive, CD-ROM, or network share). More particularly, the centralized storage volume 320 may be mounted by providing the operating system with the metadata describing the organization of information on the volume, how to read and/or write the information, or the like. By mounting the centralized storage volume 320, the host 210 as well as the VM 330 on the host 210 can access information stored in the centralized storage volume 320.

The method 400 then proceeds to step 420, where unique information assigned to the VM 330 is obtained. For example, in some embodiments, such information may be retrieved by the deployment script which is invoked in response to the boot-up of the VM 330. Examples of the information include WWPN, MAC address and/or other relevant information of the VM 330, such as name or identifier of the VM 330.

Figure 5:
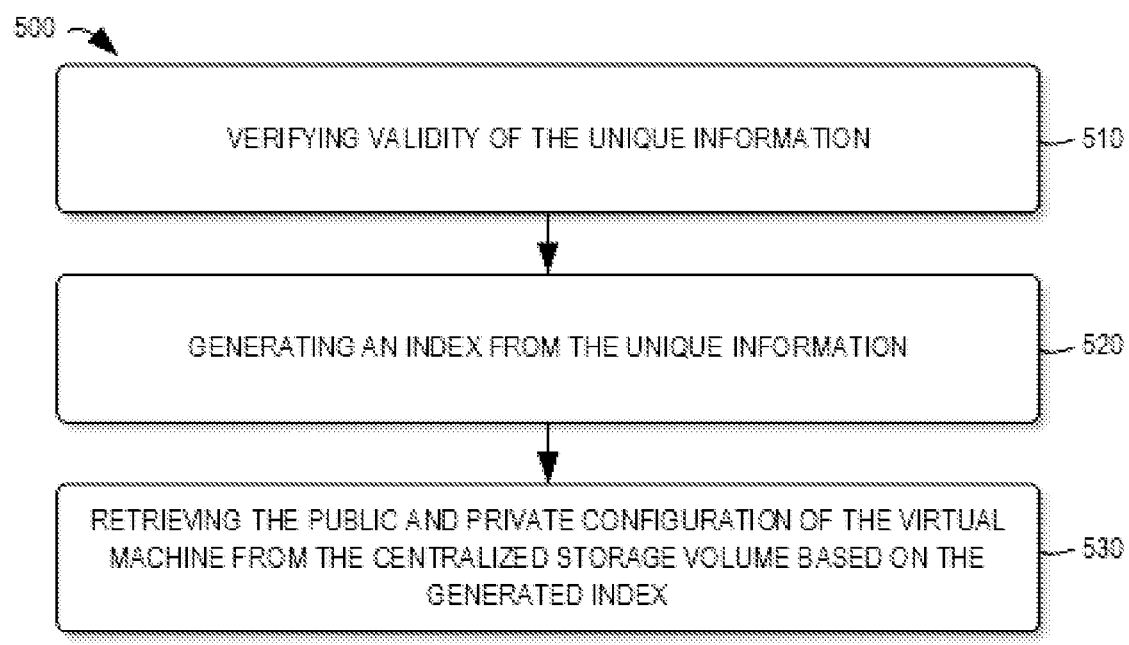
FIG. 5 is a flowchart of a method 500 for quick deployment of multiple virtual machines in accordance with embodiments of the present invention.
Figure 6:
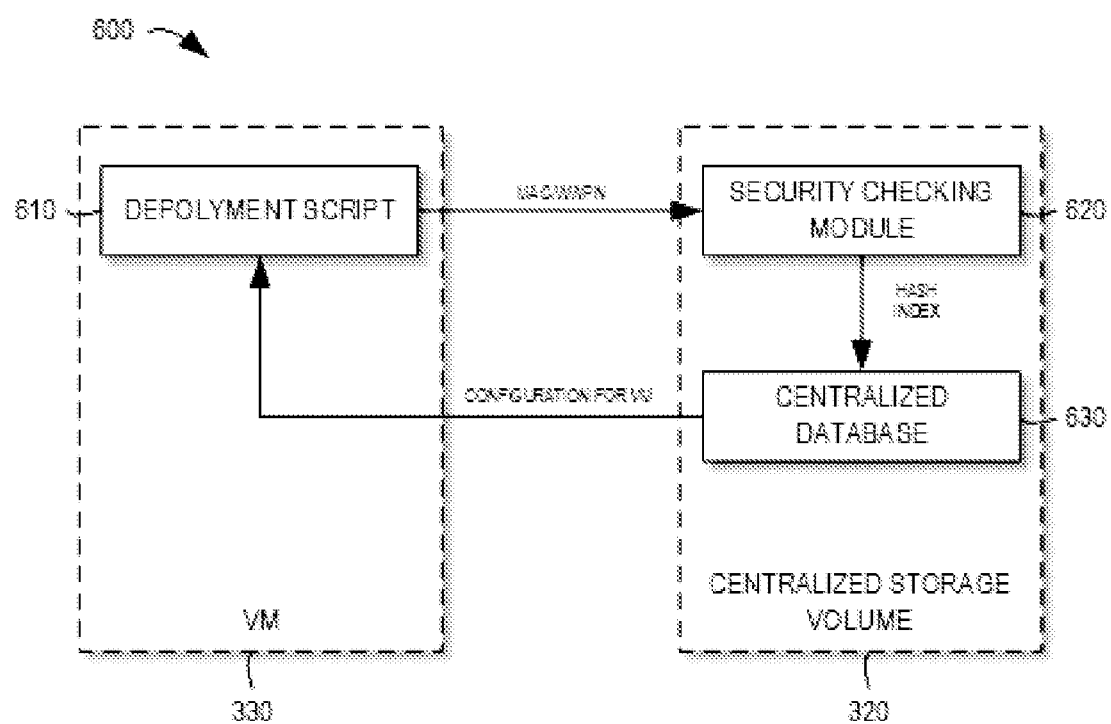
FIG. 6 is a schematic diagram for quick deployment of multiple virtual machines in accordance with embodiments of the present invention.

Then, the method 400 proceeds to step 430, where public and private configuration for the VM 330 is retrieved from the centralized storage volume 320 based on the obtained unique information. In general, the configuration for the VM 330 may be retrieved from the centralized storage volume 320 based on a hash index generated from the unique information if the unique information is verified to be valid. An example embodiment in this regard will be discussed with reference to FIGS. 5 and 6. FIG. 5 shows a flowchart of a method of retrieving the configuration for the VM from the centralized storage volume. FIG. 6 is a schematic diagram for retrieving the configuration for the VM from the centralized storage volume.

In step 510, validity of the unique information of the VM 330 is verified. As described above, in some embodiments, an invoked deployment script (for example, the deployment script 610) may obtain the configuration such as the WWPN and the MAC address of the VM 330. Then, the deployment script 610 may invoke a security checking module 620 and pass the WWPN and the MAC address of the VM 330 to the security checking module 620. The security checking module 620 may be a software module which is stored on the centralized storage volume 320 and can be invoked by different deployment scripts from different VMs. Alternatively or additionally, the security checking module 620 may be a separate device which is able to access the centralized storage volume 320. In other embodiments, the security checking module 620 may also be implemented as a part of the host 210, for example, as a module executed thereon. Further, the security checking module 620 may check the validity of the WWPN and the MAC address of the VM 330, for example, according to certain pre-defined rules specified by a user. Considering the MAC address of the VM 330 as an example, its validity may be determined by checking whether its value exceeds a pre-defined range, whether it contains an invalid character, or the like. It should be understood that step 510 is an optional step.

The method 500 then proceeds to step 520, where an index is generated from the unique information. In some embodiments, the index may be generated from the unique information if the unique information is verified to be valid in step 510. As described above, in some embodiments, the configuration of the VM 330 may be stored as a record in a centralized database 630 included in the centralized storage volume 320. The record storing the configuration for the VM 330 may be indexed by a hash index which is generated from the unique information assigned to the VM 330 with certain algorithm. In order to retrieve the configuration for the VM 330 from the centralized storage volume 320, an index may be generated from the unique information if the unique information, such as the WWPN and the MAC address of the VM 330, is determined to be valid. In some embodiments, the generation of the hash index may also be performed by the security checking module 620, for example.

Then in step 530, the public and private configuration of the VM 330 is retrieved from the centralized storage volume 320 based on the index generated in step 520. In some embodiments, the security checking module 620 and/or another module may utilize the index to access the centralized database 630 on the centralized storage volume 320 and retrieve the configuration of the VM 330. By way of example, in those embodiments where the centralized database 630 is implemented as an XML database, the centralized database 630 may be accessed by XQuery tool for the XML database or any other suitable approaches.

As described above, the configuration of the VM 330 retrieved from the centralized database 630 in the centralized storage volume 320 may include private configuration and public configuration. The public configuration may include patches for an operating system and files shared between virtual machines and so on. Such public configuration is accessible to both the VM 330 and other VMs. The private configuration may include IP address, network mask, gateway address, DNS address, post-install scripts, applications to be installed and so on. For security purpose, the private configuration may be encrypted and then stored in the centralized database. The encryption can be done by any encryption algorithms such as a symmetric encryption mechanism, such as RC5. The unique information assigned to the VM 330 (such as, the combination of its WWPN and MAC address) may be as the key in encryption, such that the private configuration may be only accessible to the VM 330 itself. In such embodiments, the retrieved private configuration needs to be decrypted with the corresponding decryption algorithm. The decryption of the retrieved private configuration is performed by using the unique information of the VM 330 such as its WWPN and MAC address as the key. In some embodiments, the decryption is performed by the security checking module invoked by the deployment scrip.

In some embodiments, the retrieved public and private configuration for the VM 330 may be used to customize the VM 330 during its boot-up, for example, by the deployment script 610. As such, the VM 330 may be deployed on the host 210. Likewise, multiple VMs can be deployed on a host quickly and securely.

It would be appreciated that, in some embodiments, the methods 400 and/or 500 may be performed by a deployment script include in a VM's boot-up procedure and/or one or more software modules invoked by the deployment script, for example. In other embodiments, some or all of these methods may also be performed by another device responsible for VM deployment.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   in response to generating a virtual machine, storing a record of public configuration and encrypted private configuration associated with the virtual machine on a centralized storage volume, wherein the public configuration comprises operating system patches, and wherein the encrypted private configuration comprises private information exclusively accessible by the generated virtual machine;
   in response to a boot-up of the virtual machine on a host, mounting the centralized storage volume on the host;
   obtaining unique information assigned to the virtual machine, wherein the unique information serves as a key to decrypting the private configuration;
   determining whether the obtained unique information is valid by performing a security check on the obtained unique information, and generating an index based on the security check; and
   retrieving public configuration and private configuration for the virtual machine from the centralized storage volume based on the generated index and verification of the obtained unique information, the public configuration and private configuration being applied in the boot-up of the virtual machine on the host.

2. The method of claim 1, wherein obtaining the unique information assigned to the virtual machine comprises:
   obtaining a World Wide Port Name (WWPN) of the virtual machine.

3. The method of claim 1, wherein generating the index from the unique information comprises:
   generating the index from the unique information in response to the unique information being verified to be valid.

4. The method of claim 1, wherein retrieving the public and private configuration for the virtual machine from the centralized storage volume comprises:
   retrieving the public and private configuration for the virtual machine from a semi-structured database in the centralized storage volume.

5. The method of claim 4, wherein the semi-structured database is an Extensive Markup Language (XML) database.

6. The method of claim 1, wherein the public configuration is accessible to the virtual machine and other virtual machines; and wherein the private configuration is only accessible to the virtual machine.

7. The method of claim 1, wherein the public and private configuration for the virtual machine is read-only in the centralized storage volume.

* * * * *